(12) United States Patent
Bruno

(10) Patent No.: US 10,773,808 B2
(45) Date of Patent: Sep. 15, 2020

(54) METHOD FOR DESIGNING AN ECS

(71) Applicant: Hamilton Sundstrand Corporation, Windsor Locks, CT (US)

(72) Inventor: Louis J. Bruno, Ellington, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 1014 days.

(21) Appl. No.: 15/172,570

(22) Filed: Jun. 3, 2016

(65) Prior Publication Data
US 2016/0355268 A1    Dec. 8, 2016

Related U.S. Application Data

(60) Provisional application No. 62/170,916, filed on Jun. 4, 2015.

(51) Int. Cl.
    *B64D 13/06*     (2006.01)
    *B64D 13/08*     (2006.01)

(52) U.S. Cl.
CPC .............. *B64D 13/06* (2013.01); *B64D 13/08* (2013.01); *B64D 2013/0618* (2013.01); *B64D 2013/0644* (2013.01); *Y02T 50/44* (2013.01); *Y02T 50/56* (2013.01)

(58) Field of Classification Search
CPC .................... B64D 13/08; B64D 13/06; B64D 2013/0644; B64D 2013/0618; B64D 2013/0648; B64D 2013/0688; B64D 2013/0603; Y02T 50/56; F02C 6/08; F02C 9/18
See application file for complete search history.

(56) References Cited

U.S. PATENT DOCUMENTS 5,063,963 A * 11/1991 Smith .................. F02C 6/08
                                                         137/606
5,461,882 A    10/1995   Zywiak
(Continued)

FOREIGN PATENT DOCUMENTS

EP      2557038 A1    2/2013

OTHER PUBLICATIONS

Extended European Search Report for EP Application No. 16173121.1, dated Oct. 11, 2016, pp. 1-8.
(Continued)

*Primary Examiner* — Frantz F Jules
*Assistant Examiner* — Martha Tadesse
(74) *Attorney, Agent, or Firm* — Cantor Colburn LLP

(57) ABSTRACT

An airplane is provided. The airplane includes an environmental control system that provides a pressurized medium to a chamber of the airplane. The airplane also includes a bleed system. The bleed system includes a plurality of ports, each of which can provide a bleed medium from an engine of the airplane to the environmental control system. The plurality of ports includes at least a first port, a second port, and a third port. The first port is selected for an idle condition. The second port is selected for a hot day cruise condition. The third port is selected for a standard operating condition. The bleed system can operate in a first mode, a second mode, or a third mode to provide the bleed medium to the environmental control system from the first port, the second port, or the third port respectively.

21 Claims, 8 Drawing Sheets

(56) References Cited

U.S. PATENT DOCUMENTS

| | | | | |
|---|---|---|---|---|
| 5,511,385 A * | 4/1996 | Drew | ............ | B64D 13/06 62/172 |
| 5,704,218 A * | 1/1998 | Christians | ............ | B64D 13/06 62/172 |
| 5,899,085 A * | 5/1999 | Williams | ............ | B64D 13/06 62/236 |
| 6,189,324 B1 * | 2/2001 | Williams | ............ | B64D 13/06 62/172 |
| 6,427,471 B1 * | 8/2002 | Ando | ............ | B64D 13/06 62/402 |
| 7,322,202 B2 * | 1/2008 | Zywiak | ............ | B64D 13/06 62/401 |
| 8,397,487 B2 * | 3/2013 | Sennoun | ............ | B64D 13/06 60/266 |
| 9,669,936 B1 | 6/2017 | Fiterman et al. | | |
| 9,701,395 B2 * | 7/2017 | Veilleux, Jr. | ............ | B64C 11/48 |
| 9,810,158 B2 * | 11/2017 | Foutch | ............ | F02C 3/10 |
| 10,144,519 B2 * | 12/2018 | Schwarz | ............ | F02C 6/08 |
| 2004/0025529 A1 * | 2/2004 | Bruno | ............ | B64D 13/06 62/402 |
| 2004/0172963 A1 * | 9/2004 | Axe | ............ | B64D 13/06 62/401 |
| 2006/0231680 A1 * | 10/2006 | Derouineau | ............ | B64D 13/02 244/118.5 |
| 2007/0113579 A1 * | 5/2007 | Claeys | ............ | B64D 13/06 62/401 |
| 2009/0298407 A1 | 12/2009 | Anderson et al. | | |
| 2012/0045317 A1 * | 2/2012 | Saladino | ............ | F02C 6/08 415/145 |
| 2012/0180509 A1 * | 7/2012 | DeFrancesco | ............ | B64D 13/06 62/172 |
| 2012/0180886 A1 * | 7/2012 | Army | ............ | B64D 13/08 137/596.14 |
| 2012/0192578 A1 * | 8/2012 | Finney | ............ | B64D 13/06 62/87 |
| 2012/0210721 A1 * | 8/2012 | Olivarez | ............ | F02C 6/08 60/772 |
| 2012/0216545 A1 * | 8/2012 | Sennoun | ............ | F02K 3/115 60/772 |
| 2014/0196469 A1 | 7/2014 | Finney et al. | | |
| 2015/0059397 A1 * | 3/2015 | Bruno | ............ | B64D 13/06 62/402 |
| 2015/0107261 A1 * | 4/2015 | Moes | ............ | B64D 13/08 60/783 |
| 2015/0251765 A1 * | 9/2015 | Jonqueres | ............ | B64D 13/08 62/86 |
| 2015/0307183 A1 * | 10/2015 | Bruno | ............ | F02C 6/08 244/209 |
| 2015/0354464 A1 * | 12/2015 | Hillel | ............ | F04D 27/0261 415/1 |
| 2019/0300179 A1 | 10/2019 | Bruno | | |

OTHER PUBLICATIONS

European Patent Office, Communication Pursuant to Article 94(3) EPC, Application No. 16173121.1-1010, dated Apr. 16, 2018, 7 pp.

Chinese Office Action; 201610393157.4; dated Jul. 11, 2019; 9 pages.

* cited by examiner

METHOD FOR DESIGNING AN ECS

CROSS-REFERENCES TO RELATED APPLICATIONS

This patent application claims priority to U.S. Provisional Patent Application Ser. No. 62/170,916, filed Jun. 4, 2015 which is incorporated herein by reference in its entirety.

BACKGROUND

In general, contemporary air condition systems are supplied a pressure at cruise that is approximately 30 psig to 35 psig. The trend in the aerospace industry today is towards systems with higher efficiency. One approach to improve airplane efficiency is to eliminate the bleed air entirely and use electrical power to compress outside air. A second approach is to use lower engine pressure. The third approach is to use the energy in the bleed air to compress outside air and bring it into the cabin. Unfortunately, each of these approaches provides limited efficiency with respect to engine fuel burn.

BRIEF DESCRIPTION

According to one embodiment, an airplane is provided. The airplane comprises an environmental control system configured to provide a pressurized medium to a chamber of the airplane; and a bleed system comprising a plurality of ports, each of the plurality of ports being configured to provide a bleed medium from an engine of the airplane to the environmental control system, wherein the plurality of ports includes at least a first port selected for an idle condition, a second port selected for a hot day cruise condition, and a third port selected for a standard operating condition, and wherein the bleed system operates in a first mode, a second mode, or a third mode to provide the bleed medium to the environmental control system from the first port, the second port, or the third port respectively.

According to one embodiment, a method of optimizing a bleed medium provided from a bleed system of an airplane to an environmental control system of the airplane is provided. The method comprises analyzing operational data of an engine of the airplane for a plurality of engine stages; choosing one or more bleed ports of the bleed system that optimally meet a required pressurization of a chamber of the airplane for a plurality of flight segments, wherein the one or more bleed ports provides the bleed medium to the environmental control system; and configuring the environmental control system to operate with the bleed medium provided by the one or more bleed ports.

Additional features and advantages are realized through the techniques of the embodiments herein. Other embodiments are described in detail herein and are considered a part of the claims. For a better understanding of the embodiments with the advantages and the features, refer to the description and to the drawings

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the FIGS.

Embodiments herein provide a method of selecting a bleed port on an engine that is suitable to provide a medium for cabin pressurization at high fuel burn efficiency and an environmental control system to work with that bleed port. The medium can generally be air, while other examples include gases, liquids, fluidized solids, or slurries.

Figure 1:
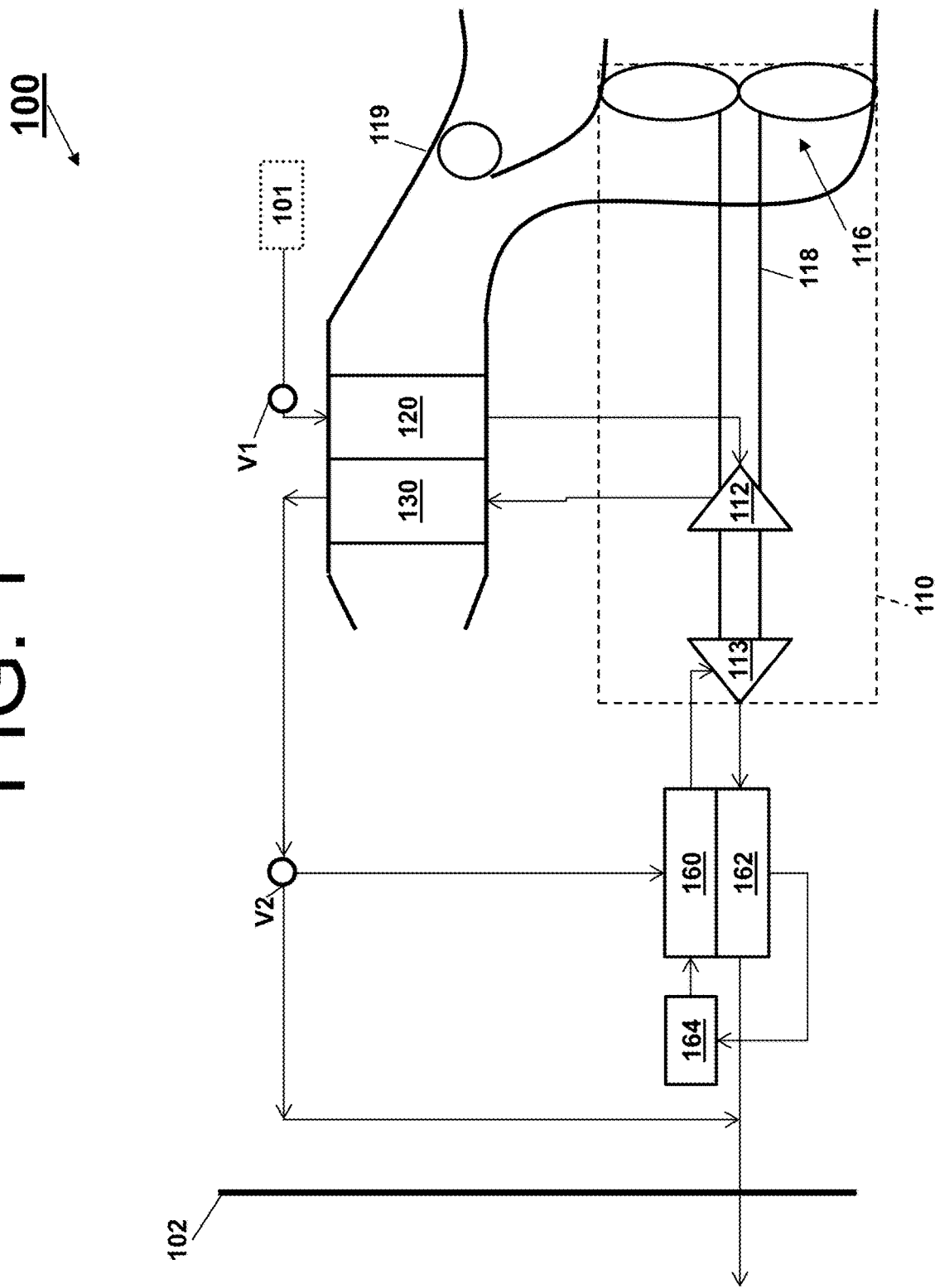
FIG. 1 is a diagram of an schematic of an environmental control system according to an embodiment.

Turning to FIG. 1, a system 100 that receives a medium from an inlet 101 and provides a conditioned form of the medium to a chamber 102 is illustrated. The system 100 comprises a compressing device 110. As shown, the compressing device 110 comprises a compressor 112, a turbine 113, a fan 116, and a shaft 118. The system 100 also comprises a primary heat exchanger 120, a secondary heat exchanger 130, a reheater 160, a condenser 162, and a water extractor 164.

The compressing device 110 is a mechanical device that includes components for performing thermodynamic work on the medium (e.g., extracts or works on the medium by raising and/or lowering pressure and by raising and/or lowering temperature). Examples of the compressing device 110 include an air cycle machine, a three-wheel machine, a four wheel-machine, etc.

The compressor 112 is a mechanical device that raises the pressure of the medium received from the inlet 101. Examples of compressor types include centrifugal, diagonal or mixed-flow, axial-flow, reciprocating, ionic liquid piston, rotary screw, rotary vane, scroll, diaphragm, air bubble, etc. Further, compressors can be driven by a motor or the medium via the turbine 113.

The turbine 113 is mechanical device that drives the compressor 112 and the fan 116 via the shaft 118. The turbine 113 can include a plurality of inlet gas flow paths, such as an inner flow path and an outer flow path, to enable mixing of alternative medium flows at the exit of the turbine. The inner flow path can be a first diameter, and the outer flow path can be a second diameter. The fan 116 (e.g., a ram air fan) is a mechanical device that can force via push or pull methods air through the shell 119 across the heat exchangers 120 and 130 at a variable cooling to control temperatures. The shell 119 receives and directs a medium (such as ram air) through the system 100. In general, ram air is outside air used as a heat sink by the system 100.

The heat exchangers 120 and 130 are devices built for efficient heat transfer from one medium to another. Examples of heat exchangers include double pipe, shell and tube, plate, plate and shell, adiabatic wheel, plate fin, pillow plate, and fluid heat exchangers.

The condenser 162 and the reheater 160 are particular types of heat exchangers. The water extractor 164 is a mechanical device that performs a process of taking water from the medium. Together, the condenser 162, the water extractor 164, and/or the reheater 160 can combine to be a high pressure water separator.

The elements of the system 100 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system 100. Valves can be operated by actuators, such that flow rates of the medium in any portion of the system 100 can be regulated to a desired value.

As shown in FIG. 1, the medium can flow from an inlet 101 through the system 100 to a chamber 102, as indicated by solid-lined arrows. A valve V1 (e.g., a mass flow control valve) controls the flow of the medium from the inlet 101 to the system 100. Further, a valve V2 controls whether the flow of the medium from the secondary heat exchanger 130 bypasses the condenser 162 in accordance with a mode of the system 100. A combination of components of the system 100 can be referred to as an air conditioning pack or a pack. The pack can begin at a valve V1 and conclude as air exits the condenser 162. An interface of the pack (a pack interface) can be at the valve V1.

The system 100 will now be described in view of the above aircraft embodiment. In the aircraft embodiment, the medium can be air and the system 100 can be an environmental control system. The air supplied to the environmental control system at the inlet 101 can be said to be "bled" from a turbine engine or an auxiliary power unit. When the air is being provided by the turbine engine or the auxiliary power unit connected to the environmental control system, such as from the inlet 101, the air can be referred to as bleed air (e.g., pressurized air that comes from an engine or an auxiliary power unit). The temperature, humidity, and pressure of the bleed air vary widely depending upon a compressor stage and revolutions per minute of the turbine engine.

The bleed air supplied to the system 100 can be provided by a bleed system. The bleed system can include a plurality of ports. In an embodiment, a method of selecting a bleed port on an engine that is suitable to provide the medium for cabin pressurization at high fuel burn efficiency to the system is provided.

The method includes receiving engine data from original equipment manufacturers. The engine data can include pressure and temperature combinations of the bleed air for every stage on the engine with respect to all flight segments. For example, a first segment can include ground idle, a second segment can include taxi, a third segment can include climb, a fourth segment can include cruise, a fifth segment can include descend, and a sixth segment can include hold. Other examples of flight segments include take-off, send again, etc. Note that one or more fight segments can be placed into buckets to ease the evaluation of the engine data.

The method also includes choosing one or more bleed ports that optimally meet a required cabin pressurization for all flight segments. For instance, to optimally meet the required cabin pressurization, each chosen bleed port can yield a bleed pressure slightly above or near the required cabin pressurization. Each bleed pressure that is slightly above or near the required cabin pressurization can be a pressure selected from a range of 2.5 psi below the required cabin pressurization to 5 psi greater than the required cabin pressurization. The one or more chosen bleed ports will be a first set of ports. From the first set of ports, a second set of one or more ports are chosen based on which are the most universal all of the for all flight segments.

For example, after applying the above method, three modes were identified. Mode A identified a bleed port at an early stage along on the engine (e.g., a low pressure port). The low pressure port can be used for climb and cruise flight segments. The low pressure port can also be a bleed port that is in-between spools of the engine.

Mode B identified a bleed port at a late stage along on the engine (e.g., a high pressure port). The high pressure port can be arranged at or near high spool compressor discharge of an engine. The high pressure port can be used for descend, ground idle, and taxi flight segments (e.g., used when the engine is operating at an idle speed).

Mode C identified a bleed port at a stage between the early and late stage of the engine (e.g., an intermediate pressure port). The intermediate pressure port can be used for a hold flight segment. Note that once the method has selected the one or more bleed ports, the system can subsequently be modified to work with that bleed port.

In view of the above, the method of selecting the bleed port on the engine that is suitable to provide the bleed air for cabin pressurization at high fuel burn efficiency will now be described. In this example, the intermediate pressure port is initially utilized for all operating conditions outside of idle speed, such as take-off, climb, cruise, hold, etc. The intermediate pressure port is arranged within the engine based on a highest altitude and hottest day flight condition (e.g., a hot day cruise condition). However, outside of this hot day cruise condition, energy within the bleed air from the intermediate pressure port is wasted.

Figure 2:
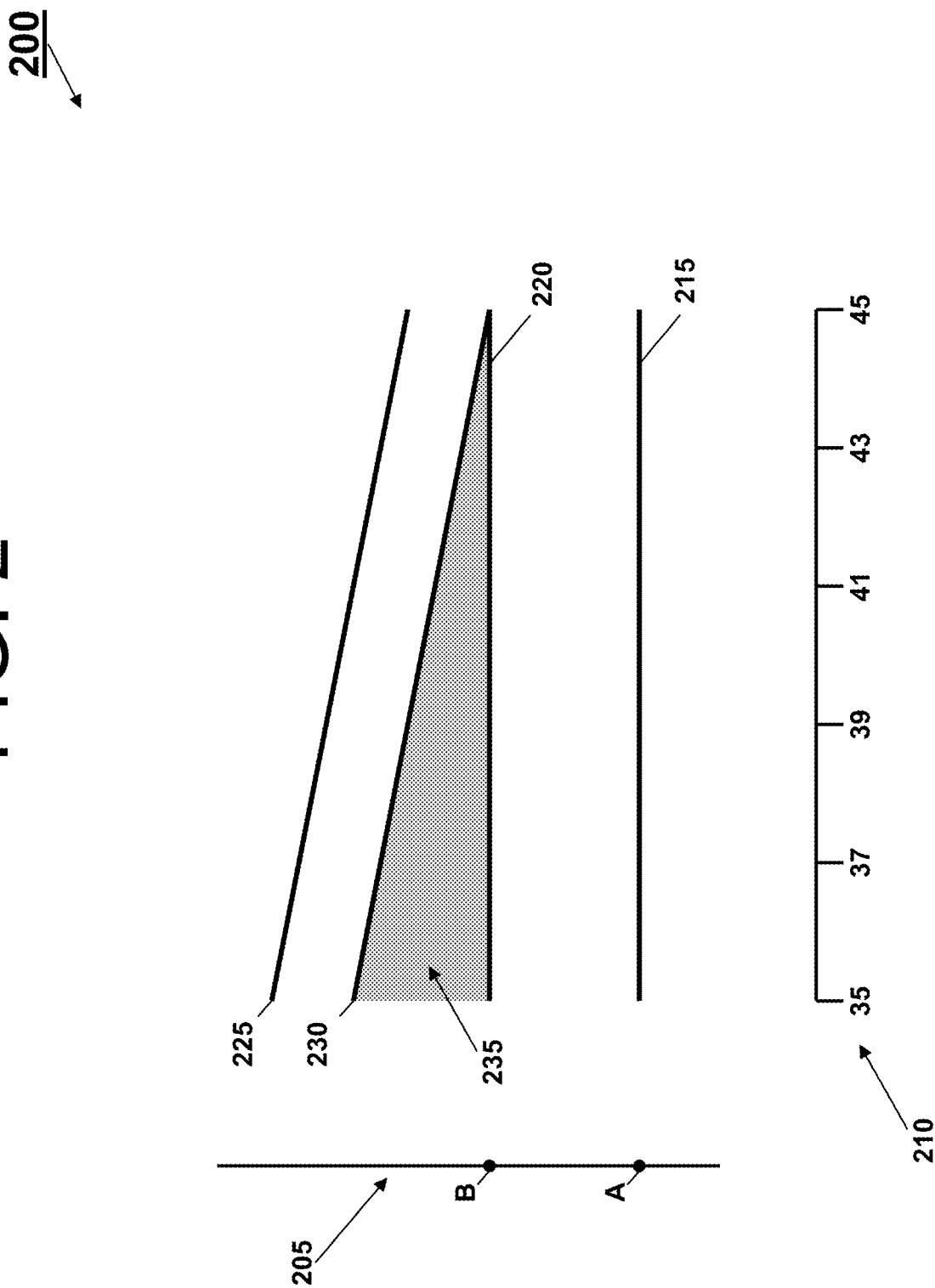
FIG. 2 is a graph of a compression of an environmental control system according to an embodiment.

For example, FIG. 2 shows a graph 200 of a compression of an environmental control system (e.g., 100) according to an embodiment. The graph 200 illustrates a bleed pressure comparison with respect to selecting a location of the intermediate pressure port within the engine based on the hot day cruise condition. That is, the graph 200 shows an end result of basing bleed port selection based on the hot day cruise condition.

The graph 200 illustrates a y-axis 205 indicating pressure and an x-axis 210 indicating altitude (at a factor of 1000 feet). Further, the graph illustrates a cabin pressure 215 (at a first pressure A), a required pressure 220 (at a second pressure B), a bleed pressure 225, a pressure at a pack interface 230, and a waste area 235. During the hot day cruise condition, such as when an airplane is cursing at 43,000 feet on a hot day, there is very little or no wasted bleed pressure 225 (or energy). This hot day cruise condition represents less than 15% of actual flight conditions of the airplane. That is, in every other flight condition or 85% of operational airplane time, there is a significant amount of waste (e.g., as indicated by the waste area 235).

To avoid this significant amount of waste, the intermediate pressure port can be arranged within the engine based on normal cruising altitudes and flight temperatures of standard operating conditions (e.g., the intermediate pressure port can be optimized for 85% of the actual flight conditions of the airplane). During standard operating conditions, less energy within the bleed air from the intermediate pressure port is wasted than in the hot day cruise condition.

Figure 3:
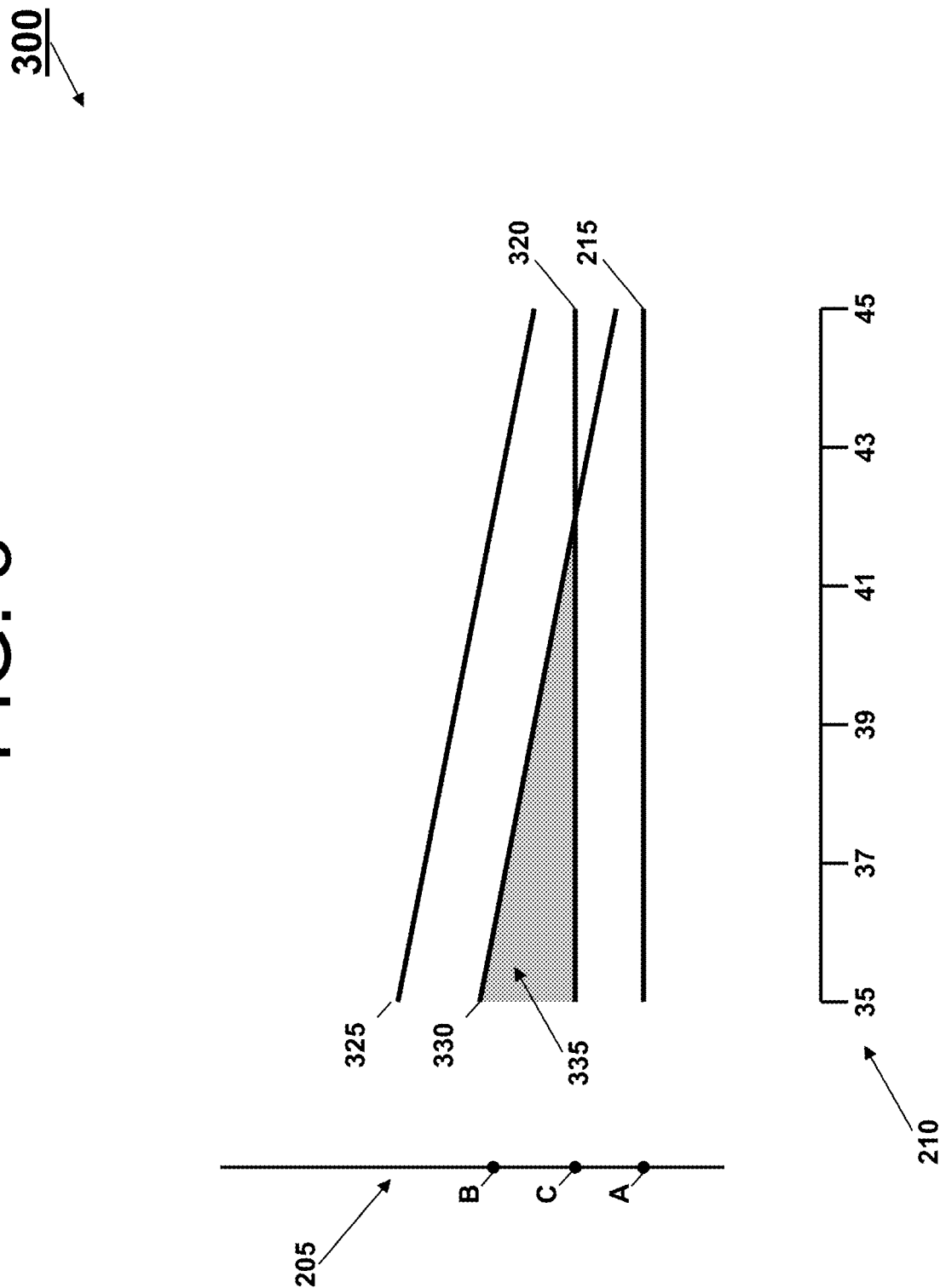
FIG. 3 is another graph of a compression of an environmental control system according to an embodiment.

For example, FIG. 3 shows a graph 300 of a compression of an environmental control system (e.g., 100) according to an embodiment. The graph 300 illustrates a bleed pressure comparison with respect to selecting a location of the intermediate pressure port within the engine based on the standard operating condition. That is, the graph 300 shows an end result of basing bleed port selection based on 85% of the actual flight conditions of the airplane.

Components of the graph 300 that are similar to the graph 200 have been reused for ease of explanation, by using the same identifiers, and are not re-introduced. The graph 300 illustrates a required pressure 320 (at a third pressure C), a bleed pressure 325, a pressure at a pack interface 330, and a waste area 335. Note that in graph 300, the required pressure 315 is lower than the required pressure 215 (e.g., the third pressure C is closer to the first pressure A than the second pressure B). Further, note that the amount of waste has been significantly reduced (e.g., the waste area 335 is less than waste area 235, as the slope of the bleed pressure 225 and bleed pressure 325 is the same), and therefore the energy used by the system 100 is reduced by a third to a half.

Yet, a challenge is inherent to selecting the intermediate bleed port with respect to the standard operating conditions as the pressure at the pack interface 330 drops below the required pressure 320 for the hot day cruise condition. Embodiments of the system 100 will now be described that address this challenge.

Figure 4:
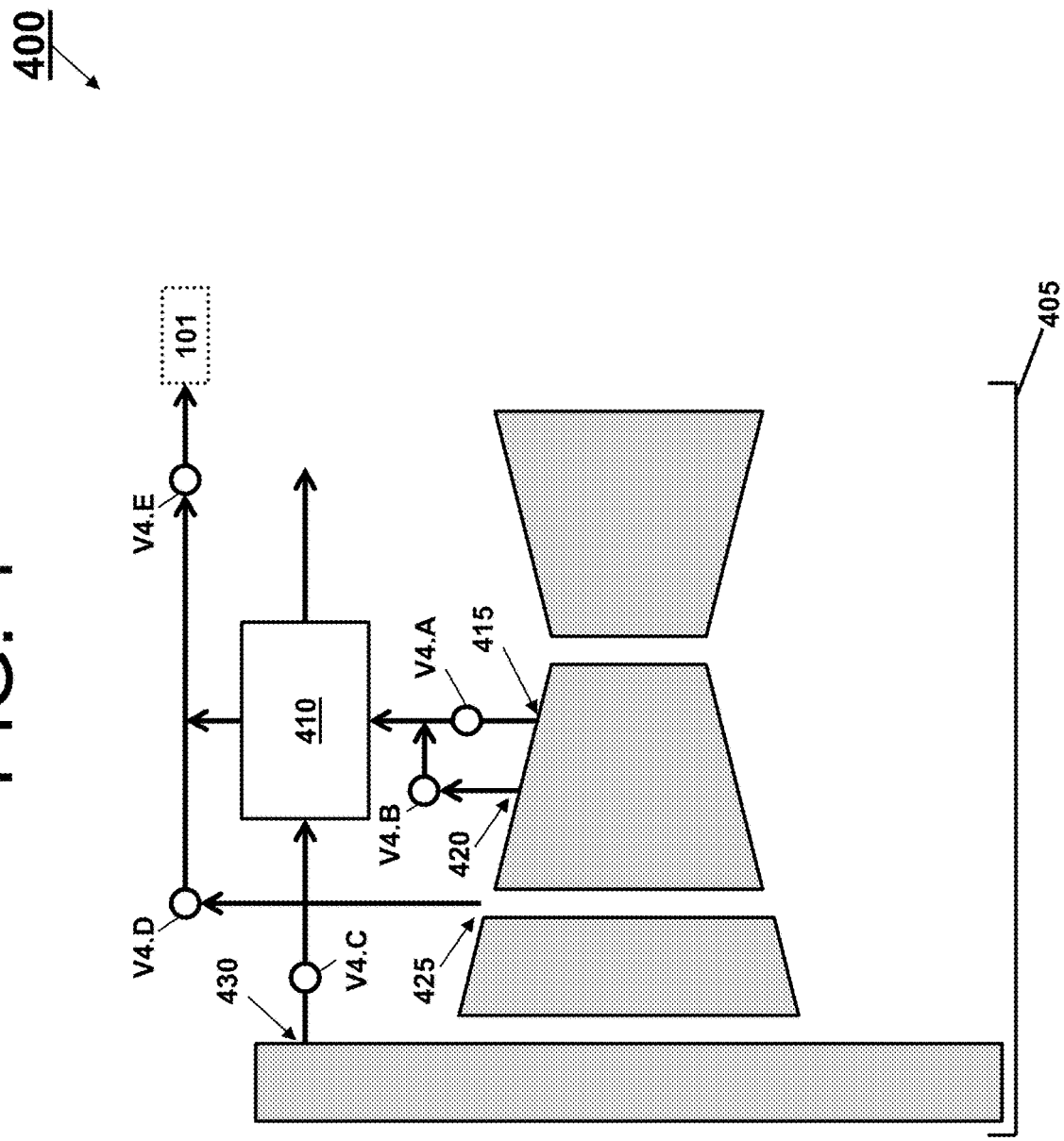
FIG. 4 is a schematic of an example of a three port bleed configuration according to an embodiment.

In an embodiment to address the challenge of the hot day cruise condition, FIG. 4 illustrates an example of a three port bleed system 400 utilized by the system 100. The three port bleed system 400 includes a precooler 410 and a plurality of valves V4.A, V4.B, V4.C, V4D, and V4.E. The precooler 410 can be designed to provide 400° F. to 450° F. air. The three port bleed system 400 also includes an engine 405 that provides bleed air from a plurality of ports (a first port 415, a second port 420, and a third port 425).

The first port 415 can be a high pressure port used for engine idle conditions, thereby being applicable to cause the three port bleed system 400 to operate in the Mode B described above. The second port 420 can be an intermediate pressure port used for hot-day cruise high-altitude cruise and/or for holding in icing conditions, thereby being applicable to cause the three port bleed system 400 to operate in the Mode C described above. The third port 425 can be a low pressure port used for take-off, climb, nominal-cruise, etc., thereby being applicable to cause the three port bleed system 400 to operate in the Mode A described above. A location of the third port 425 is arranged within the engine 405 based on the standard operating conditions. Also, fan air 430 can be extracted from a fan stream and utilized by the precooler 410 to receive heat rejected from bleed air from either of the first or second ports 415 and 420. Note that, when the third port 425 is selected, the precooler 410 can be bypassed. By bypassing the precooler 410 in this way, the precooler 410 can be optimized for the second port 420. With respect to the above method, the system 100 can be configured (or modified) to work with the bleed ports 415, 420, and 425 of the three port bleed system 400. To work with the bleed ports 415, 420, and 425, the system 100 is configured to augment the bleed pressure slightly above or near the required cabin pressurization. The result of this configuration can be one or more of a reduction of size of the precooler 410, a bypassing of the precooler 410, and a deletion of the precooler 410. That is, if the three port bleed system 400 enables bleed ports with temperatures below an auto-ignition temperature of fuel, then the precooler 410 can be bypassed or deleted all together. Otherwise, if the precooler 410 is needed for certain operating condition, then the precooler 410 can be a reduced size to meet those conditions.

For example, the selection of the second port 420 can be based on the hot day cruise condition and/or on the airplane hold condition in icing conditions, so that parameters surrounding these conditions can be used to size the precooler 410. That is, if the hot day cruise condition is selected, an airplane's fuel burn is optimized for a small amount of fight conditions that occur on hot days, while a size and a weight of the precooler 410 can be reduced. If the holding in icing conditions is selected, a small amount of performance is sacrificed at the hot day cruise condition, while the size and the weight of the precooler 410 can be greatly reduced. The reduction in the size and the weight of the precooler 410 provides additional benefits for a majority of cruise conditions.

In other embodiments to address the challenge of the hot day cruise condition, FIGS. 5-8 are discussed. FIGS. 5-8 illustrate examples of augmenting power so that the system 100 can work with the intermediate pressure port that has the engine location based on the standard operating condition.

Figure 5:
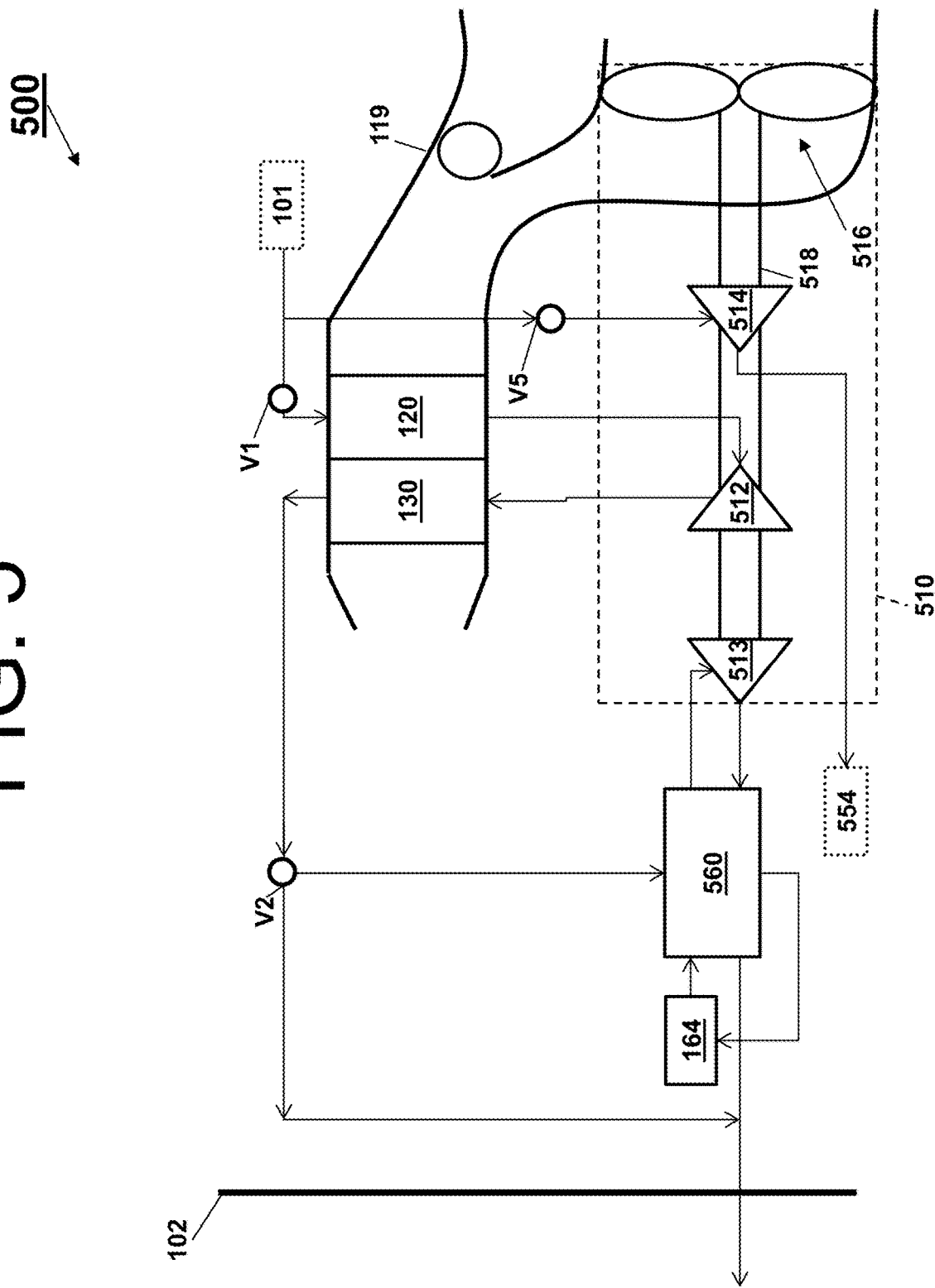
FIG. 5 is operation example of an environmental control system that utilizes additional bleed air, where the environmental control system includes an additional turbine, according to an embodiment.

Turning to FIG. 5, a schematic of an environmental control system 500 is provided. The environmental control system 500 is a modification of the system 100, by including an additional energy source to meet the challenge of the hot day cruise condition. Components of the system 500 that are similar to the system 100 have been reused for ease of explanation, by using the same identifiers, and are not re-introduced. Alternative components of the environmental control system 500 include a compressing device 510 (that comprises a compressor 512, a turbine 513, a turbine 514, a fan 516, and a shaft 518), an outlet 554, a condenser 560.

The turbine 514 is additional turbine mounted on the shaft 518 of the compressing device 510 that receives bleed air from the engine. For example, a path for the bleed air flows from inlet 101 though valve V5 and the turbine 514 to the outlet 554. Note that in one or more embodiments, an exhaust from the turbine 514 can be released to ambient air through the shell 119 or sent to the outlet 545 (e.g., a cabin pressure control system). This bleed air is extracted from the engine and expanded across the turbine 514 for hot day cruise conditions. The compressor 512 is used to boost the bleed pressure based on power from both the turbine 513 and the turbine 514.

Figure 6:
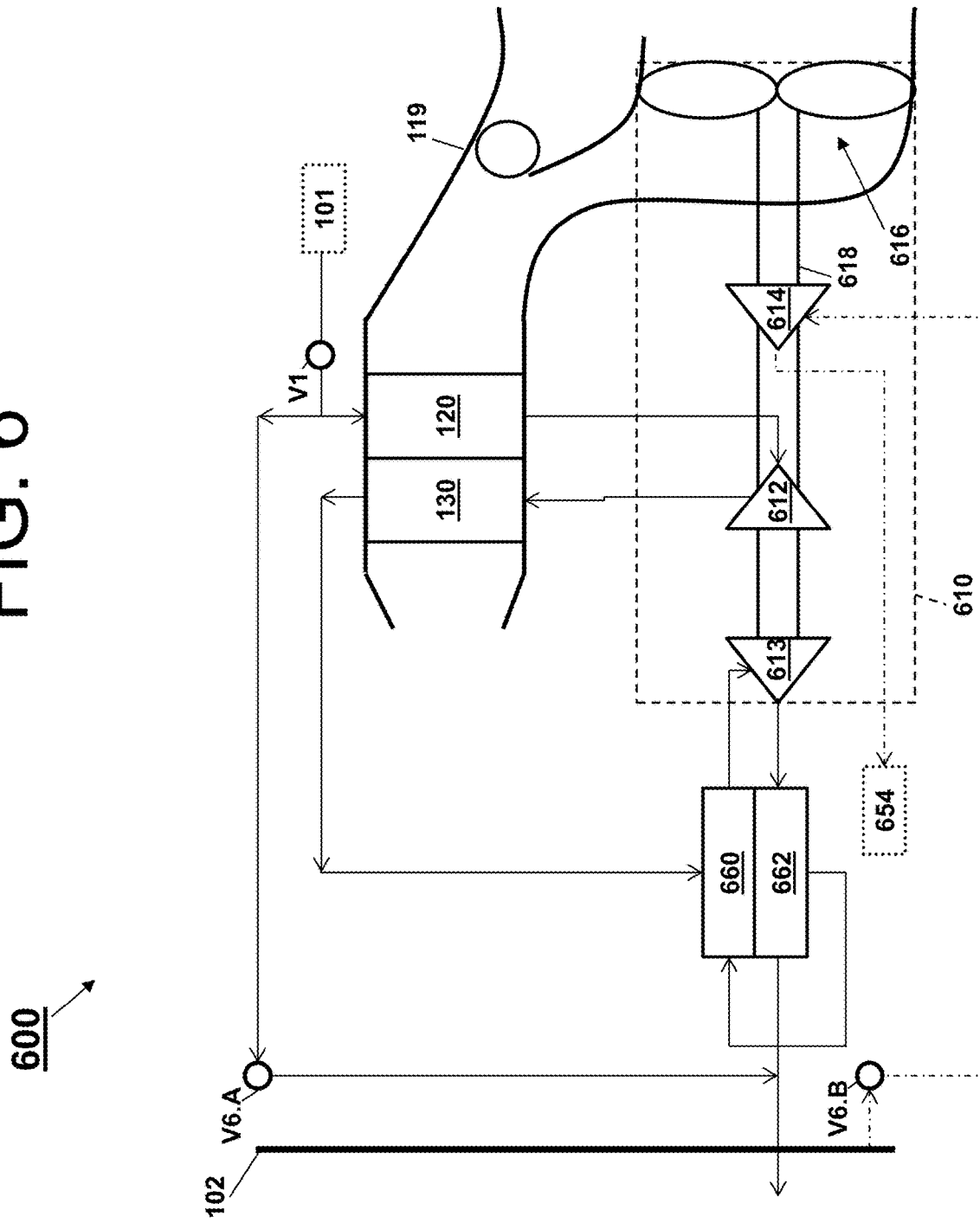
FIG. 6 is operation example of an environmental control system that utilizes cabin discharge air, where the environmental control system includes an additional turbine, according to another embodiment.

Turning to FIG. 6, a schematic of an environmental control system 600 is provided. The environmental control system 600 is a modification of the system 100, by including an additional energy source to meet the challenge of the hot day cruise condition. Components of the system 600 that are similar to the system 100 have been reused for ease of explanation, by using the same identifiers, and are not re-introduced. Alternative components of the environmental control system 600 include a compressing device 610 (that comprises a compressor 612, a turbine 613, a turbine 614, a fan 616, and a shaft 618), an outlet 654, a reheater 660, and a condenser 662.

The turbine 614 is additional turbine mounted on the shaft 618 of the compressing device 5610 that receives cabin discharge air from the chamber 102 (e.g., a path for the cabin discharge air flows from chamber 102 though valve V6.B and the turbine 614 to the outlet 654). The cabin discharge air is air being provided from the chamber 102 (e.g., air leaving a pressurized volume, cabin of the aircraft, or cabin and flight deck of the aircraft). The cabin discharge air can be referred as chamber discharge air, pressured air. Note that in one or more embodiments, an exhaust from the turbine 614 can be released to ambient air through the shell 119 or sent to the outlet 645 (e.g., a cabin pressure control system). This cabin discharge air is extracted from the chamber 102 and expanded across the turbine 614 for hot day cruise conditions. The compressor 612 is used to boost the bleed pressure based on power from both the turbine 613 and the turbine 614.

Figure 7:
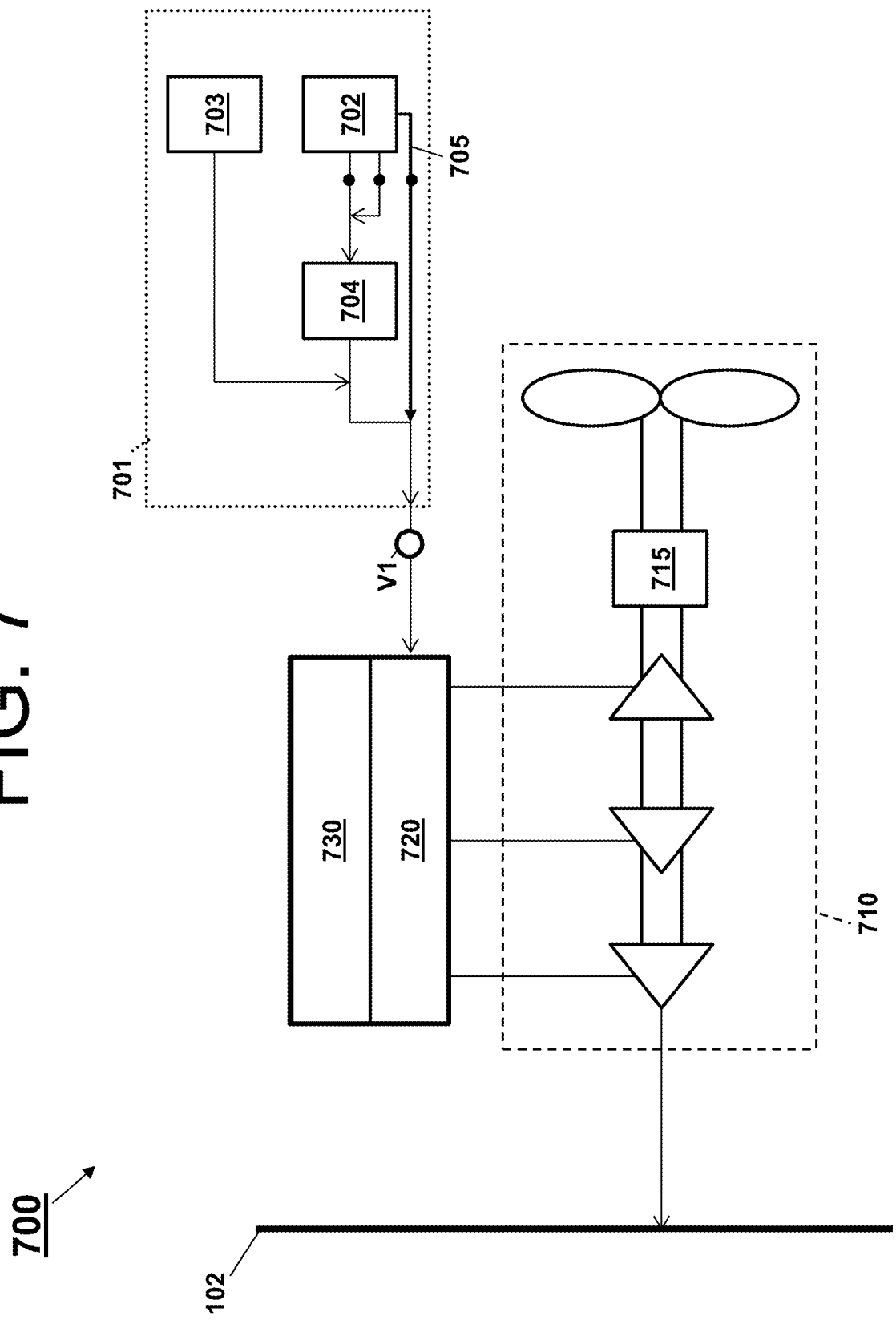
FIG. 7 is a schematic of an example of an environmental control system that utilizes a motor according to another embodiment.

Turning to FIG. 7, a schematic of an environmental control system 700 is provided. The environmental control system 700 is a modification of the system 100, by including an additional energy source to meet the challenge of the hot day cruise condition. Components of the system 700 that are similar to the system 100 have been reused for ease of explanation, by using the same identifiers, and are not re-introduced. Alternative components of the environmental control system 700 include an inlet 701 comprising a schematic of a bleed system. This bleed system includes an engine 702, auxiliary power unit 703, and a precooler 704, along with an alternative low pressure path for bleed air from the engine 702 that bypasses the precooler 704. Alternative components of the environmental control system 700 also include a compressing device 710 (that comprises a compressor, turbines, a fan, a shaft, and a motor 715) and heat exchangers 720 and 730.

The motor 715 can utilize electrical power. In this approach, electrical power is used to drive the compressor of the compressing device 710. The compressing device 710 or an additional turbo machine can be used to boost the pressure.

The motor 715 can utilize hydraulic power. In this approach, hydraulic power is used to drive the compressor of the compressing device 710. The compressing device 710 or an additional turbo machine can be used to boost the pressure.

Figure 8:
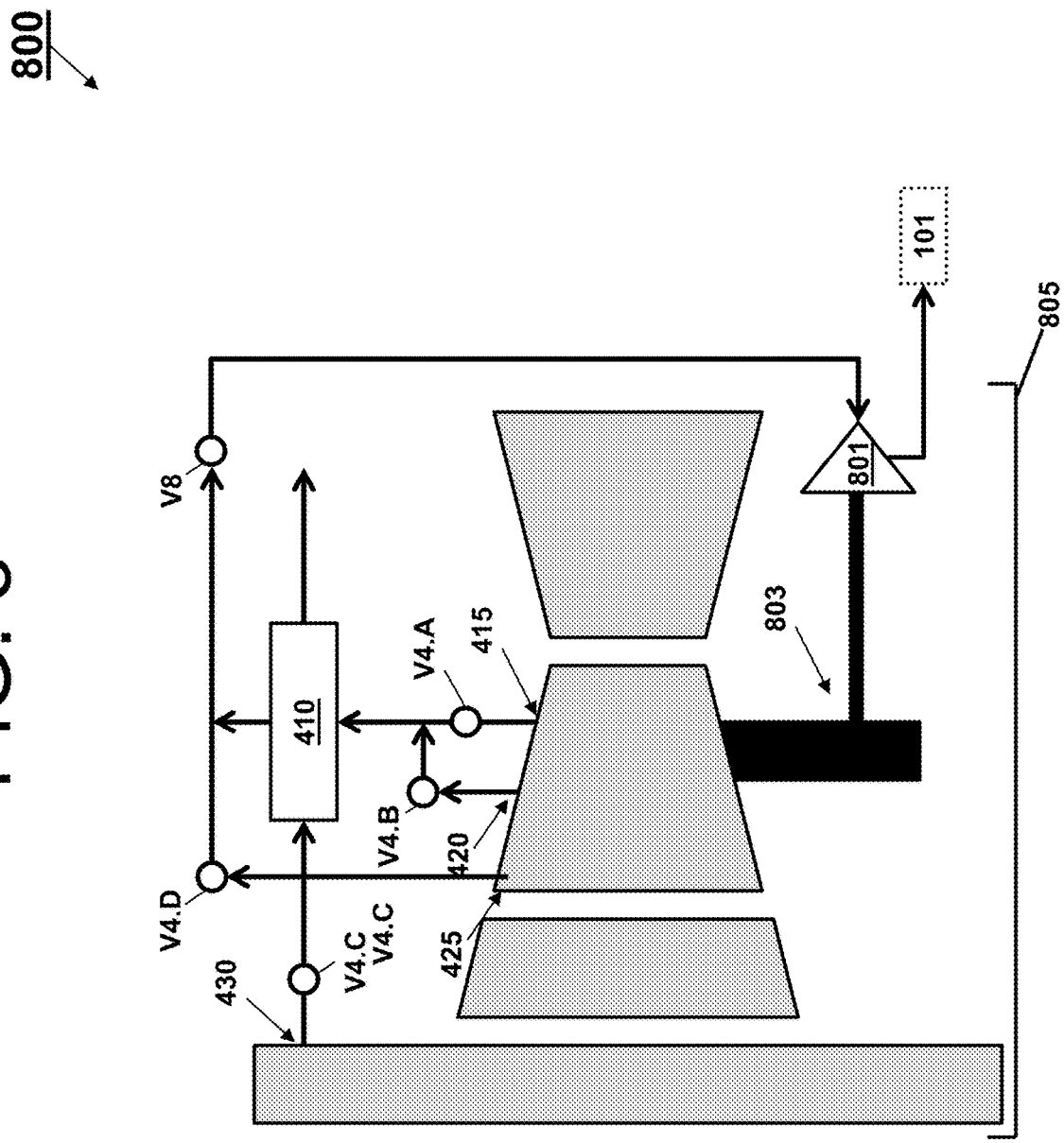
FIG. 8 a schematic of an example of a mechanically powered bleed configuration according to another embodiment.

Turning to FIG. 8, a schematic of bleed system 800 of an environmental control system is provided. The bleed system 800 includes a compressor 801 mounted on a gear box 803 of an engine 805 to meet the challenge of the hot day cruise condition. Components of the system 800 that are similar to the system 400 have been reused for ease of explanation, by using the same identifiers, and are not re-introduced. In this mechanical power approach, air shaft horsepower is used to drive the compressor 801 that then supplies bled air to the environmental control system through valve V8 via inlet 101.

In view of the above, an embodiment includes an airplane. The airplane comprises an environmental control system configured to provide a pressurized medium to a chamber of the airplane; and a bleed system comprising a plurality of ports, each of the plurality of ports being configured to provide a bleed medium from an engine of the airplane to the environmental control system, wherein the plurality of ports includes at least a first port selected for an idle condition, a second port selected for a hot day cruise condition, and a third port selected for a standard operating condition, and wherein the bleed system operates in a first mode, a second mode, or a third mode to provide the bleed medium to the environmental control system from the first port, the second port, or the third port respectively.

In another embodiment or the above airplane embodiment, the first port can comprise a high pressure port and the first mode can be used for the idle condition.

In another embodiment or any of the above airplane embodiments, the second port can comprise an intermediate pressure port and the second mode can be used for the hot day cruise condition.

In another embodiment or any of the above airplane embodiments, the third port can comprise a low pressure port and the third mode can be used for at for the standard operating condition.

In another embodiment or any of the above airplane embodiments, the bleed system can comprise a precooler.

In another embodiment or any of the above airplane embodiments, the precooler can be bypassed by the bleed medium during the third mode.

In another embodiment or any of the above airplane embodiments, the environmental control system can comprise a compressing device comprising a compressor configured to pressurize the bleed medium.

In another embodiment or any of the above airplane embodiments, the compressing device can comprise a motor to provide power to the compressor.

In another embodiment or any of the above airplane embodiments, the motor can be an electrically powered motor.

In another embodiment or any of the above airplane embodiments, the motor can be a hydraulically powered motor.

In another embodiment or any of the above airplane embodiments, the compressing device can comprise a turbine to provide power to the compressor.

In another embodiment or any of the above airplane embodiments, the turbine can be configured to receive the bleed medium.

In another embodiment or any of the above airplane embodiments, the turbine can be configured to receive a discharge medium from the chamber.

In another embodiment or any of the above airplane embodiments, the bleed system can comprise a turbine coupled to a gearbox of the engine and be configured pressurize the bleed medium.

In view of the above, an embodiment includes a method of optimizing a bleed medium provided from a bleed system of an airplane to an environmental control system of the airplane. The method comprises analyzing operational data of an engine of the airplane for a plurality of engine stages; choosing one or more bleed ports of the bleed system that optimally meet a required pressurization of a chamber of the airplane for a plurality of flight segments, wherein the one or more bleed ports provides the bleed medium to the environmental control system; and configuring the environmental control system to operate with the bleed medium provided by the one or more bleed ports.

In another embodiment or the above method embodiment, the environmental control system can comprise a compressing device comprising a compressor configured to pressurize the bleed medium, and the configuring of the environmental control system can comprise augmenting the pressurization of the bleed medium by providing power to the compressor via a motor.

In another embodiment or the above method embodiment, the motor can be an electrically powered motor.

In another embodiment or the above method embodiment, the motor can be a hydraulically powered motor.

In another embodiment or the above method embodiment, the environmental control system can comprise a compressing device comprising a compressor configured to pressurize the bleed medium, and the configuring of the environmental control system can comprise augmenting the pressurization of the bleed medium by providing power to the compressor via a turbine.

In another embodiment or the above method embodiment, the turbine can be configured to receive the bleed medium.

In another embodiment or the above method embodiment, the turbine can be configured to receive a discharge medium from the chamber.

In another embodiment or the above method embodiment, the bleed system can comprise a turbine coupled to a gearbox of the engine, and the turbine can be configured pressurize the bleed medium.

In another embodiment or the above method embodiment, the engine data can comprise pressure and temperature combinations of the bleed air for every stage on the engine with respect to a plurality of flight segments.

In another embodiment or any of the above method embodiments, the plurality of flight segments can comprise a first segment including ground idle, a second segment including taxi, a third segment including climb, a fourth segment including cruise, a fifth segment including descend, and a sixth segment including hold.

In another embodiment or any of the above method embodiments, each of the one or more bleed ports can yield a bleed pressure above the required pressurization.

In another embodiment or any of the above method embodiments, the bleed system can operate in a first mode, a second mode, or a third mode to provide the bleed medium to the environmental control system from a first port, a second port, or a third port, respectively, the one or more bleed ports.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of embodiments herein. For instance, the steps may be performed in a differing order or steps may be added, deleted or modified. All of these variations are considered a part of the claims.

While the preferred embodiment has been described, it will be understood that those skilled in the art, both now and in the future, may make various improvements and enhancements which fall within the scope of the claims which follow. These claims should be construed to maintain the proper protection.

The invention claimed is:

1. An airplane comprising:
   an environmental control system configured to provide a pressurized medium to a chamber of the airplane, the environmental control system including compressing device comprising a compressor, a first turbine, a second turbine, and a fan mounted to a shaft; and
   a bleed system comprising a plurality of ports, each of the plurality of ports being configured to provide a bleed medium from an engine of the airplane to the environmental control system,
   wherein the plurality of ports includes at least a first port selected for an idle condition, a second port selected for a hot day cruise condition, and a third port selected for a standard operating condition, wherein a pressure of the bleed medium provided via the second port is near the required cabin pressurization during a hot day cruise condition
   wherein the bleed system operates in a first mode, a second mode, or a third mode to provide the bleed medium to the environmental control system from the first port, the second port, or the third port respectively;
   wherein the second port is an intermediate pressure port, and during the hot day cruise condition, a first portion of the bleed medium provided from the second bleed port is expanded across the second turbine and is exhausted to ambient, and a second portion of the bleed medium is provided to the compressor to pressurize the bleed medium, the compressor being driven by power from both the first turbine and the second turbine.

2. The system of claim 1, wherein the first port comprises a high pressure port and the first mode is used for the idle condition.

3. The system of claim 1, wherein the bleed system includes a precooler.

4. The system of claim 3, wherein the precooler is bypassed by the bleed medium during the third mode.

5. The system of claim 1, wherein the compressing device comprises:
   a motor to provide power to the compressor.

6. The system of claim 5, wherein the motor is an electrically powered motor.

7. The system of claim 5, wherein the motor is a hydraulically powered motor.

8. The system of claim 1, wherein at least one of the first turbine and the second turbine is configured to receive the bleed medium.

9. The system of claim 1, wherein at least one of the first turbine and the second turbine is configured to receive a discharge medium from the chamber.

10. The system of claim 1, wherein the bleed system comprises:
    a compressor coupled to a gearbox of the engine and configured pressurize the bleed medium.

11. A method of optimizing a bleed medium provided from a bleed system of an airplane to an environmental control system of the airplane, the environmental control system including compressing device comprising a compressor, a first turbine, a second turbine, and a fan mounted to a shaft, the method comprising:
    analyzing operational data of an engine of the airplane for a plurality of engine stages;
    choosing a plurality of bleed ports of the bleed system that optimally meet a required pressurization of a chamber of the airplane for a plurality of flight segments, wherein one of the plurality of bleed ports is positioned such that a pressure of the bleed medium provided there through is near the required cabin pressurization during a hot day cruise condition of the plurality of flight segments, wherein the plurality of bleed ports provides the bleed medium to the environmental control system; and configuring the environmental control system to operate with the bleed medium provided by the one or more bleed ports, wherein the one or more bleed ports comprises an intermediate pressure port operable to provide bleed medium at an intermediate pressure for the hot day cruise condition and a lower pressure port operable to provide bleed medium at a first pressure to the environmental control system during a standard operating condition of the plurality to flight segments, the first pressure being lower than the intermediate pressure;

wherein during the hot day cruise condition, a first portion of the bleed medium provided from the second bleed port is expanded across the second turbine and is exhausted to ambient, and a second portion of the bleed medium is provided to the compressor, the compressor being driven by power from both the first turbine and the second turbine.

12. The method of claim 11, wherein the environmental control system comprises a compressing device comprising a compressor configured to pressurize the bleed medium, and wherein the configuring of the environmental control system comprises:

augmenting the pressurization of the bleed medium by providing power to the compressor via a motor.

13. The method of claim 12, wherein the motor is an electrically powered motor.

14. The method of claim 12, wherein the motor is a hydraulically powered motor.

15. The method of claim 11, wherein at least one of the first turbine and the second turbine is configured to receive the bleed medium.

16. The method of claim 11, wherein at least one of the first turbine and the second turbine is configured to receive a discharge medium from the chamber.

17. The method of claim 11, wherein the bleed system comprises a compressor coupled to a gearbox of the engine and wherein the turbine is configured pressurize the bleed medium.

18. The method of claim 11, wherein the engine data comprises pressure and temperature combinations of the bleed air for every stage on the engine with respect to a plurality of flight segments.

19. The method of claim 11, wherein the plurality of flight segments comprises a first segment including ground idle, a second segment including taxi, a third segment including climb, a fourth segment including cruise, a fifth segment including descend, and a sixth segment including hold.

20. The method of claim 11, wherein each of the plurality of bleed ports yields a bleed pressure slightly above or near the required pressurization.

21. The method of claim 11, wherein the bleed system operates in a first mode, a second mode, or a third mode to provide the bleed medium to the environmental control system from a first port, a second port, or a third port, respectively, of the plurality of bleed ports.

* * * * *